US010963394B2

(12) United States Patent
Kachare et al.

(10) Patent No.: US 10,963,394 B2
(45) Date of Patent: Mar. 30, 2021

(54) SYSTEM AND METHOD FOR OPTIMIZING PERFORMANCE OF A SOLID-STATE DRIVE USING A DEEP NEURAL NETWORK

(71) Applicant: Samsung Electronics Co., Ltd., Suwon-si (KR)

(72) Inventors: Ramdas P. Kachare, Pleasanton, CA (US); Sompong Paul Olarig, Pleasanton, CA (US); Vikas Sinha, Sunnyvale, CA (US); Zvika Guz, Palo Alto, CA (US)

(73) Assignee: Samsung Electronics Co., Ltd.

( * ) Notice: Subject to any disclaimer, the term of this patent is extended or adjusted under 35 U.S.C. 154(b) by 177 days.

(21) Appl. No.: 16/012,470

(22) Filed: Jun. 19, 2018

(65) Prior Publication Data
US 2019/0317901 A1  Oct. 17, 2019

Related U.S. Application Data

(60) Provisional application No. 62/658,190, filed on Apr. 16, 2018.

(51) Int. Cl.
*G06F 12/1009* (2016.01)
*G06F 12/02* (2006.01)
(Continued)

(52) U.S. Cl.
CPC ........ *G06F 12/1009* (2013.01); *G06F 3/0604* (2013.01); *G06F 3/064* (2013.01);
(Continued)

(58) Field of Classification Search
None
See application file for complete search history.

(56) References Cited

U.S. PATENT DOCUMENTS 9,785,572 B1  10/2017  Lercari et al.
2008/0005736 A1*  1/2008  Apacible ............... G06F 9/4843
                                                      718/100

(Continued)

OTHER PUBLICATIONS

Zhou, You et al; "Understanding and Alleviating the Impact of the Flash Address Translation on Solid State Devices"; ACM Trans. Storage 13, 2, Article 14; May 2017; 29 pages.

(Continued)

*Primary Examiner* — Jared I Rutz
*Assistant Examiner* — Marwan Ayash
(74) *Attorney, Agent, or Firm* — Innovation Counsel LLP (57) ABSTRACT

A controller of a data storage device includes: a host interface providing an interface to a host computer; a flash translation layer (FTL) translating a logical block address (LBA) to a physical block address (PBA) associated with an input/output (I/O) request; a flash interface providing an interface to flash media to access data stored on the flash media; and one or more deep neural network (DNN) modules for predicting an I/O access pattern of the host computer. The one or more DNN modules provide one or more prediction outputs to the FTL that are associated with one or more past I/O requests and a current I/O request received from the host computer, and the one or more prediction outputs include at least one predicted I/O request following the current I/O request. The FTL prefetches data stored in the flash media that is associated with the at least one predicted I/O request.

24 Claims, 3 Drawing Sheets

(51) Int. Cl.
   *G06F 12/109*   (2016.01)
   *G06F 3/06*   (2006.01)
   *G06N 20/00*   (2019.01)

(52) U.S. Cl.
   CPC .......... *G06F 3/0659* (2013.01); *G06F 3/0688* (2013.01); *G06F 12/0246* (2013.01); *G06F 12/109* (2013.01); *G06N 20/00* (2019.01)

(56) References Cited

U.S. PATENT DOCUMENTS

| | | | |
|---|---|---|---|
| 2008/0288716 A1* | 11/2008 | Arakawa | G06F 12/0246 711/103 |
| 2016/0381176 A1* | 12/2016 | Cherubini | H04L 67/2847 709/219 |
| 2017/0075629 A1 | 3/2017 | Manohar et al. | |
| 2017/0185543 A1* | 6/2017 | Nieuwejaar | G06F 3/061 |
| 2018/0067863 A1* | 3/2018 | Ki | G06F 12/126 |
| 2018/0276116 A1* | 9/2018 | Hahn | G06F 12/0246 |
| 2019/0129834 A1* | 5/2019 | Purkayastha | G06F 12/0246 |
| 2019/0303028 A1* | 10/2019 | Rawal | G06F 3/061 |

OTHER PUBLICATIONS

Kirk, Jeff; "The Transformation of Science with HPC, Big Data, and AI"; HPC & AI Technology Strategist, Dell EMC; Oct. 17, 2017; 31 pages.

\* cited by examiner

SYSTEM AND METHOD FOR OPTIMIZING PERFORMANCE OF A SOLID-STATE DRIVE USING A DEEP NEURAL NETWORK

CROSS-REFERENCE TO RELATED APPLICATION(S)

This application claims the benefits of and priority to U.S. Provisional Patent Application Ser. No. 62/658,190 filed Apr. 16, 2018, the disclosure of which is incorporated herein by reference in its entirety.

TECHNICAL FIELD

The present disclosure relates generally to a deep neural network, more particularly, to a system and method for optimizing performance of a solid-state drive (SSD) using a deep neural network.

BACKGROUND

A solid-state drive (SSD) includes flash media to store data. A host accesses the data stored in the SSD using a logical block address (LBA). When the host performs a data input/output (I/O) request, an SSD controller of the SSD may need to execute several internal operations in order to fulfill the host I/O operation. For example, the SSD controller in response to a host I/O request fetches a data structure of a flash translation layer (FTL) if it is not present on-chip, performs LBA lookup for logical to physical address translation, fetches user data from the physical location (page/block) via one or more flash channels. In addition, the SSD controller may perform error corrections using complex algorithms such as low-density parity check (LDPC) and Bose-Chaudhuri-Hocquenghem (BCH), uncompress the error-corrected data, decrypt the uncompressed data, update the FTL data structure, and provide various statistical data and logs to the host computer, and offload a cache. Further, the SSD controller need to perform the above steps in the presence of internal background operations such as recycling and garbage collection.

The steps and operations to access the data stored in the SSD as described above can be complex and consume much of SSD controller's resources and time. While employing complex algorithms to perform and manage internal tasks necessary for the SSD, the SSD controller needs to provide a sufficient bandwidth and latency to the host computer to perform host-initiated I/O operations. At the same time, the SSD controller tries to consume the least amount of power and use the minimal resources such as memory buffers to optimize the cost of the I/O operations.

SUMMARY

According to one embodiment, a controller of a data storage device includes: a host interface providing an interface to a host computer; a flash translation layer (FTL) translating a logical block address (LBA) to a physical block address (PBA) associated with an input/output (I/O) request received from the host computer via the host interface; a flash interface providing an interface to flash media of the data storage device to access data stored on the flash media of the data storage device; and one or more deep neural network (DNN) module for predicting an I/O access pattern of the host computer. The host interface provides one or more input vectors to the one or more DNN modules, the one or more DNN modules provide one or more prediction outputs to the FTL that are associated with one or more past I/O requests and a current I/O request received from the host computer using the one or more input vectors, and wherein the one or more prediction outputs include at least one predicted I/O request following the current I/O request. The FTL prefetches data stored in the flash media that is associated with the at least one predicted I/O request.

According to another embodiment, a data storage device includes: one or more flash media; a controller configured to control the one or more flash media; and one or more deep neural network (DNN) modules for predicting an I/O access pattern of a host computer. The one or more DNN modules receive one or more input vectors from the controller, provide one or more prediction outputs to the controller that are associated with one or more past I/O requests and a current I/O request received from the host computer using the one or more input vectors, and the one or more prediction outputs include at least one predicted I/O request following the current I/O request. The controller prefetches data stored in the flash media that is associated with the at least one predicted I/O request.

According to another embodiment, a bridge device includes: one or more processors; one or more deep neural network (DNN) modules; a processor access module providing an interface between the one or more processors and the one or more DNN modules; a host interface; and a device interface to a solid-state drive (SSD). The one or more DNN modules receive one or more input vectors from the SSD via the host interface, provide one or more prediction outputs to the SSD that are associated with one or more past I/O requests from the remote initiator and a current I/O request received from the remote initiator using the one or more input vectors, and the one or more prediction outputs include at least one predicted I/O request following the current I/O request. The SSD prefetches data stored in the flash media that is associated with the at least one predicted I/O request and provides the data to the bridge device via the device interface.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and, together with the general description given above and the detailed description of the preferred embodiment given below, serve to explain and teach the principles described herein.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for optimizing performance of a solid-state drive (SSD) using a deep neural network. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Prediction of an imminent host access input/output (I/O) operation can be very useful to optimize the performance of a solid-state drive (SSD). As host applications perform their functions repetitively in time, some of these host access patterns may emerge with respect to I/O access patterns to data storage devices such as SSDs. Such storage-access patterns may be difficult to discern as they may repeat over longer durations. Moreover, many host applications may share the data storage device, hence multiple patterns that may originate from multiple host applications may become difficult to recognize and discern from one another. The present disclosure proposes a deep neural network (DNN)-based approach to detect temporal and spatial patterns of host I/O accesses inside an SSD controller or combination of an SSD controller and a field-programmable gate array (FPGA).

When an SSD controller receives host I/O operations, the SSD controller performs translation from the logical address (e.g., logical block address (LBA)) to physical address (e.g., physical block address (PBA)) and fetch the user data from the physical address (e.g., page or block) into an on-chip buffer (e.g., a read buffer). The SSD controller may run an error correction algorithm such as low-density parity check (LDPC) and Bose-Chaudhuri-Hocquenghem (BCH) to exclude uncommon host I/O access patterns and correct any bit errors that may occur during the read operation, and further decrypt and/or un-compress the user data before providing it to the requesting host. All these operations may have to contend for the limited resources of the SSD with internal background operations such as recycling and garbage collection (GC).

If the SSD controller has advance knowledge of the host I/O operations (e.g., LBAs to access subsequently) in the near future, the SSD controller can process some of the operations in advance and provide the optimized performance for the requested host I/O operation. For example, with the knowledge of imminent storage accesses by the host, the SSD controller can prefetch the user data from flash media that is highly likely to be accessed to fulfill the host I/O operations with a higher hit rate and a low latency while optimizing its internal background operations. For example, multiple host applications performing their functions repetitively for long durations may give rise to certain patterns of LBA sequences. However, detection of long and complex LBA patterns using state machines can be complex and impractical. The present system and method provides detection of LBA patterns or command patterns in host I/O accesses and prediction of imminent access to specific physical addresses of an SSD. The present technique for host access pattern recognition can be applied to detect both spatial patterns (e.g., LBA) and temporal patterns to achieve optimal allocation and use of internal resources of the SSD.

The present disclosure describes a technique for detecting spatial patterns in host I/O accesses using a neural network. Various applications running on one or more hosts may store user data in the same data storage device such as an SSD. This is more likely to happen with a significant increase of the storage capacity of the SSD as the technology evolves. As host applications read and write data from the SSD, there may be multiple patterns present in the data accesses to the SSD. Such patterns could be long and spread out over time. The SSD controller of the SSD can detect various patterns of data accesses by the host applications such as LBA or LBA-cluster patterns, non-volatile memory express (NVMe) commands (herein also referred to as opcodes), and/or imminent idle gaps or characteristics of anticipated host storage accesses. The SSD controller can use information regarding the patterns of data accesses based on various indicators to optimize the performance of the SSD in terms of bandwidth, latency, and the usage of the internal resources.

According to one embodiment, the present system and method can employ a deep neural network (DNN)-based scheme such as a long short term memory (LSTM) network and a convolutional neural network (CNN) to efficiently detect data access patterns by host applications such as LBA/LBA-cluster patterns and predict imminent host access I/O operations such as LBA/LBA-cluster accesses and imminent host commands. The predicted host access I/O operations can be used to not only perform SSD-internal operations to provide the data requested by the host but also to schedule internal background operations utilizing the knowledge of the imminent host I/O access operations. Examples of such operations include, but are not limited to 1) prefetch of data (separately from a cache prefetch), 2) optimization of cache eviction policies, 3) optimized execution of the imminent command such as Flush, Trim, and NVMe management interface (NVMe-MI) commands, and 4) optimized scheduling of internal background operations such as recycling and garbage collection (GC).

Figure 1:
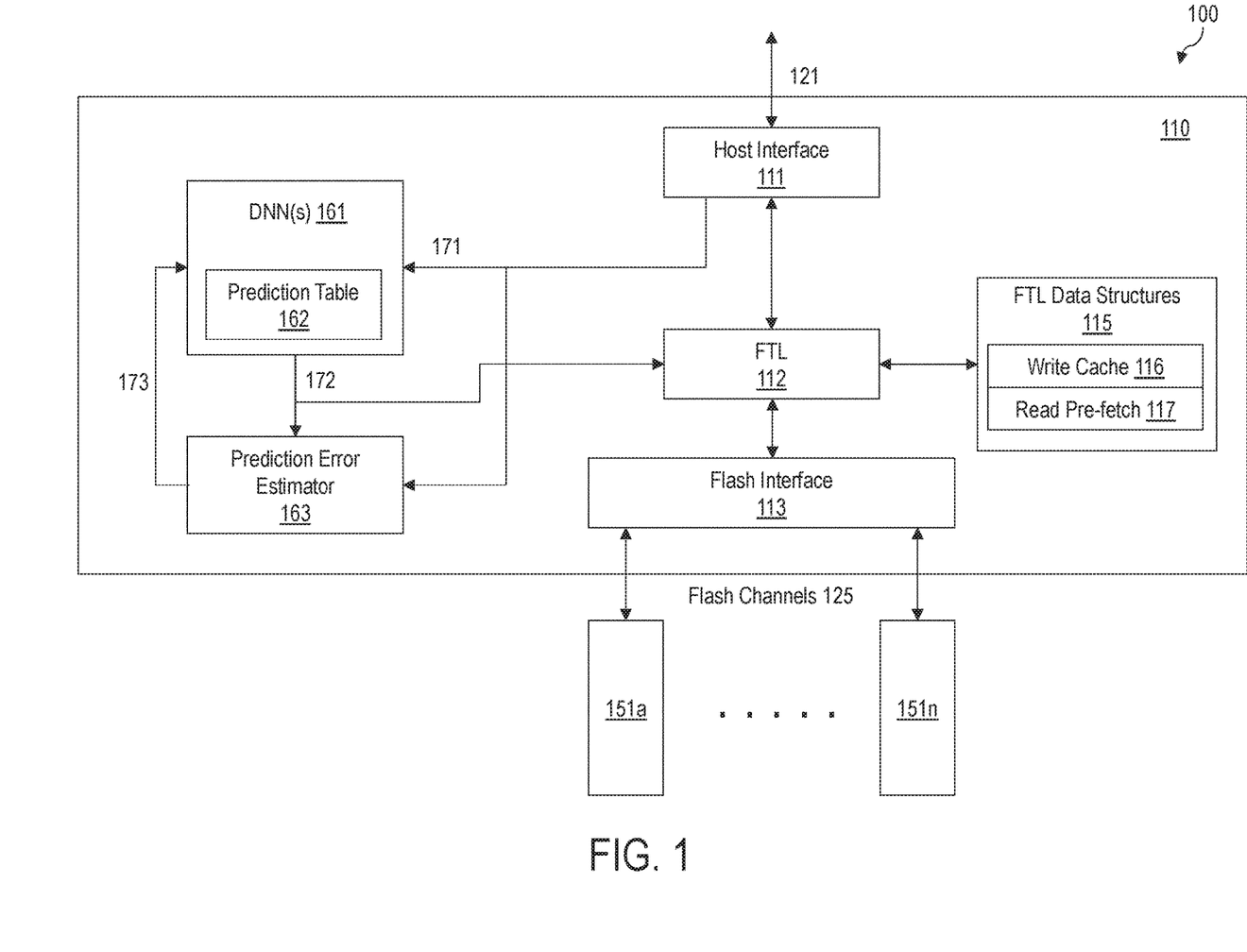
FIG. 1 shows a block diagram of an example SSD that has an access pattern recognition capability, according to one embodiment.

FIG. 1 shows a block diagram of an example SSD that has an access pattern recognition capability, according to one embodiment. The SSD 100 includes an SSD controller 110 and one or more flash media 151. The SSD controller 110 has three functional units or partitions including a host interface 111, a flash translation layer (FTL) 112, and a flash interface 113. The flash interface 113 of the SSD controller 110 accesses the flash media 151 (e.g., a NAND chip) via respective flash channels 125.

In some embodiments, the SSD 100 is compatible with the non-volatile memory (NVMe) standard or the NVMe over Fabrics (NVMe-oF) standard. In the case of NVMe-oF, a host computer (not shown) running a host application may be coupled to the SSD 100 over a variety of network fabrics including, but not limited to, Ethernet, Fibre Channel, and InfiniBand. The terms, host computer and host application may be interchangeably used in the present disclosure without causing confusion.

The host interface 111 can receive host I/O commands 121 over various protocols such as peripheral component interconnect express (PCIe) or Ethernet, perform command fetching, initiation of the command execution, data transfers, and posting of completion entries back to the host application. The host interface 111 may parse the fetched commands, extract LBA, length of data transfer, and other command fields from the parsed commands, and provide them to the FTL layer 112. The FTL layer 112 performs translation from a logical address (e.g., logical block address) to a corresponding physical address and interfaces with the flash interface 113 to exchange user data as well as internal data necessary to execute background operations. A physical address may be in the form of a tuple, for example, (flash channel, block number, page number, page offset). The physical address can be used to either fetch the user data for a read command or program (or write) the received data for a write command depending on the type of the host I/O command.

Figure 2:
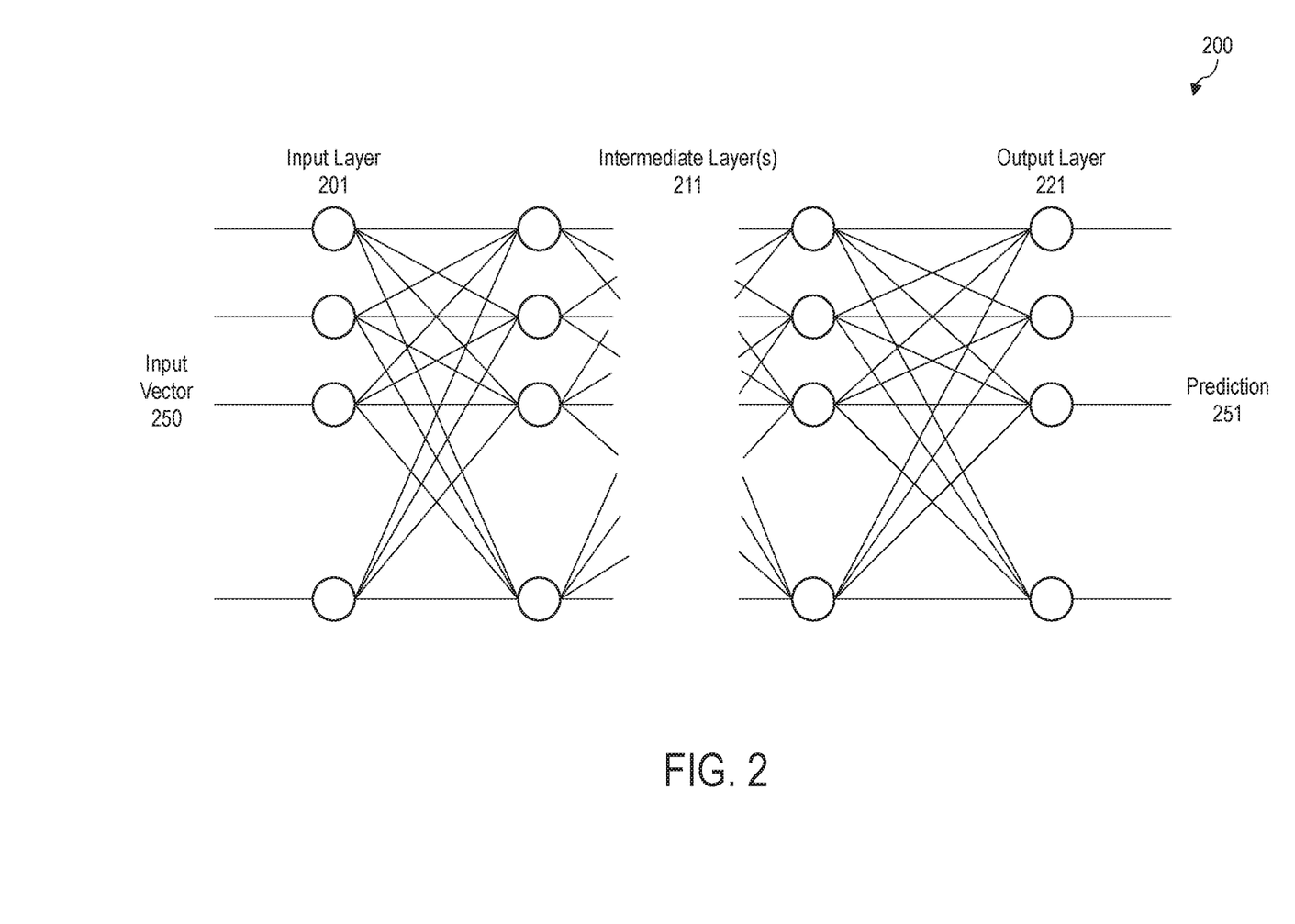
FIG. 2 shows a block diagram of an example DNN model, according to one embodiment.

As the host interface 111 fetches commands and presents the LBAs and other fields to the FTL layer 112, the host interface 111 also provides a set of inputs 171 (herein also referred to as an input vector) to one or more DNN engines of a DNN module 161. Each DNN engine may be herein also referred to as a DNN processor employing a respective DNN model as shown in FIG. 2. In the example shown in FIG. 1, the DNN module 161 is implemented as a part of the SSD controller 110 that manages and controls access to the flash media 151 of the SSD 110. However, it is understood that the DNN module 161 and/or the prediction estimator 163, which will be discussed in further detail below, may be implemented as being external to the SSD 100 without deviating from the scope of the present disclosure.

According to one embodiment, the SSD controller 110 may be implemented in a field-programmable gate array (FPGA) and an application-specific integrated circuit (ASIC). In another embodiment, a DNN module and an SSD controller can be implemented in a single ASIC. The present SSD 100 implemented with the DNN module 161 can be applied to various target applications such as computer vision including pattern recognition, image classification, object detection, and segmentation. The present SSD 100 implemented with the DNN module 161 can be further applied to other commercial applications such as autonomous driving and augmented reality (AR) or virtual reality (VR).

The DNN module 161 processes the input vectors 171 such as an LBA, an opcode, a delta time, a namespace ID (NSID), a host ID, etc. and predicts LBA or LBA cluster that may be imminently accessed by the host application. The results of the DNN predictions may be stored in a prediction table 162 that associates one or more past host I/O request and a current host I/O request to a predicted host I/O request that may follow the current host I/O request. The format of the prediction table 162 may vary depending on the system configuration and the target application(s).

The prediction output 172 from the DNN module 161 such as an LBA, an opcode, an idle time, etc. are fed to the FTL layer 112 to perform various lookup actions to optimize the performance of the SSD 100 in response to a detected pattern of the host I/O operations. As the host application accesses the user data, the prediction error estimator 163 compares the predicted pattern of host I/O access and the actual host I/O access detected, and calculates any prediction errors 173 of the DNN module 161 if the result of the prediction result mismatches the actual host access pattern(s). The prediction error estimator 163 feeds the prediction errors 173 back to the DNN 161 for further training and relearning. The (re)training/(re)learning process of the DNN module 161 continues to refine the DNN model and better predict the patterns of the host I/O operations to optimize the performance of the SSD 100. The prediction table 162 is updated as the training/learning processes repeat.

The host interface 111 feeds an input vector 171 to the DNN module 161 as host accesses occur. The input vector 171 may include various inputs regarding the host accesses that can be used to identify access patterns to the flash media 151. The DNN module 161 may detect the host access patterns using not only the current input vector but also a plurality of input vectors that are received prior to the current input vector as the host access patterns may be identified over the plurality of input vectors. Examples of entries included in the input vector 171 are, but not limited to, an LBA, a range of LBA(es), a length of a host access (read/write), a number of a host access (read/write), a namespace ID, a host ID (e.g., a host NVMe qualified name (NQN)), a command opcode (OPC), an I/O type as indicated by the command opcode (e.g., read/write/flush etc.), a stream ID, an NVM set ID, a time delta and/or a time stamp, and other relevant storage parameters.

Examples of the prediction outputs 172 that are fed to the FTL 112 include, but are not limited to, an LBA, an LBA cluster, a type of a host access (e.g., host commands, read/write/flush etc.), an imminent idle gap, an imminent access volume (e.g., b/w, size etc.), and other information regarding the DNN module 161.

According to one embodiment, the present system and method can implement and use various features in conjunction with one or more DNN modules (e.g., an LSTM network, a CNN) to efficiently detect access patterns of host I/O operations. Examples of such features can include, but should not be limited to, supervised learning (e.g., a user-initiated learning) and unsupervised learning (e.g., self-learning or training), and learning new patterns and forgetting non-active patterns. Some of these features of the present system and method will be discussed below in more detail.

According to one embodiment, the present system and method can operate a long short term memory (LSTM) network. The LSTM network includes a plurality of LSTM units (or blocks) to form layers of a recurrent neural network (RNN). A LSTM unit is composed of a cell and a plurality of gates such as an input gate, an output gate, and a forget gate. The cell is responsible for "remembering" values over arbitrary time intervals. Each of the three gates functions as a "conventional" artificial neuron in the multi-layer feed-forward RNN. These gates can compute an activation (using an activation function) of a weighted sum, and these gates and the cell are connected to one another. The expression "long short-term" refers to the fact that the LSTM network can model a short-term memory that can last for a long period of time. The LSTM model is well-suited to classify, process and predict time series given time lags of unknown size and duration between important events.

A sequence of I/O feature descriptors is maintained by the LSTM network and is used for making inferences regarding the next I/O operation or the next few I/O operations. The items in each I/O feature descriptor are described as an "input vector" as discussed above. The input vector is updated as new host commands are received. The sequence is an input to a trained LSTM network that is capable of matching that sequence, if it has been seen before, and making predictions for the next I/O operation(s).

According to one embodiment, LBA accesses in a host command may be converted into chunk numbers, where a larger chunk size corresponds to the size of an erase block on the flash media 151. The prediction output 172 from the DNN module 161 of the next chunk number to be accessed may be fed to the FTL 112 to schedule prefetching, garbage collection, and other operations on the corresponding chunk and the erase block.

The LSTM network can be configured to be continuously trained as host accesses are performed. A maximum size (herein also referred to as an epoch length) of the sequence that are selected for LSTM training may be determined based on several constraints. For example, the maximum size of the sequence may be greater or equal to the maximum length of accesses in which a host access pattern is to be identified. In addition, the maximum size of the sequence may be less than or equal to the maximum length for which the available computational resources for the pattern detection do not result in a delay or impact to other SSD operations, particularly, host-initiated I/O operations. In general, a larger maximum epoch length requires more resources. According to one embodiment, the maximum size of the sequence for the LSTM training may be selected and updated as the system requirement and an operating condition of the SSD changes. In one embodiment, the maximum size of the sequence based for LSTM training may be determined based on a target application or target applications that store and access user data in the flash media 151, the availability of resources (e.g., a processor, a memory buffer) of the DNN module 161 for training/learning and performing prediction of host access patterns, and the workloads received from the host applications for I/O operations.

According to one embodiment, the present system and method can employ a multi-layered neural network to detect sequences of a host access pattern. FIG. 2 shows a block diagram of an example DNN model, according to one embodiment. The DNN model 200 includes multiple layers including an input layer 201, one or more intermediate layers 211, and an output layer 221. Each layer of the DNN model 200 includes a plurality of nodes, herein also referred to as neurons. Each node or neuron represents a computational unit that has one or more inputs and an output. Each input from a plurality of nodes in a layer may be fed to each node in an adjacent layer. Similarly, the output may be fed to a plurality of nodes in an adjacent layer.

In the present example, the input layer 201 has l number of nodes, each of the intermediate layers 211 has m number of nodes, and the output layer 221 has n number of nodes. Each node in the network is connected to every node in an adjacent layer. The numbers of the nodes l, m, n, may be the same or different from each other depending on an application of the DNN model 200. Although the present example shows only two intermediate layers 211 having the same number of nodes, it is understood that any number of intermediate layers and different number of nodes in each of the intermediate layers may be present without deviating from the scope of the present disclosure.

According to one embodiment, the DNN model 200 may be implemented in an application running on a host computer. The host computer may have a plurality of processors such as central processing units (CPUs) and/or graphics processing units (GPUs) as computing resources of the DNN model 200. According to another embodiment, the DNN model 200 may be implemented in a data storage device such as a solid-state drive (SSD) that includes one or more CPUs and/or GPUs as computing resources of the DNN model 200. In other embodiments, the plurality of computing resources may be distributed over a computer system, and computation in the DNN model 200 may be distributed over one or more host computers and one or more data storage devices.

The input layer 210 receives input vectors 250 (e.g., the input vectors 171 of FIG. 1), and the output layer 221 can produce prediction outputs 251 (e.g., the prediction output 172 of FIG. 1). The input vectors 250 may include one or more of an LBA or a range of LBAs, an opcode, a stream ID, a namespace ID, a data size, a time stamp, etc. The prediction output 251 may include information concerning the next or a few of next commands to be issued by the host. For each of the host commands predicted based on a sequence of the input vectors 250, the prediction output 251 may correspond to an imminent host command itself, an LBA or a range of LBAs corresponding to a read or write command that is likely to be issued by the host, or a data size of the command.

In another example, the prediction output 251 may include a categorical variable indicating whether the predicted host command is a read, write, flush (synchronize cache) command, a management command, or a diagnostic command.

According to one embodiment, the DNN model 200 including an LSTM network may be trained in a designated training mode where multiple randomly chosen I/O workloads are sent from the host to the SSD in order to perform the training using a range of possible access patterns. Alternatively, the LSTM network may be designed such that the SSD controller (e.g., the SSD controller 110 of FIG. 1) is periodically and constantly learning from incoming host commands so long as its prediction success rate keeps improving. Information concerning a sequence of imminent host commands is periodically sent to the trained LSTM model for producing inference regarding the next few host commands. If the trained LSTM model shows a low level of accuracy, the SSD controller may set a flag or a value that triggers an entirely new re-training and or the current inference activity to be terminated, and allocate and claim resources to execute a new LSTM training.

Referring to FIG. 1, the SSD controller 110 uses the predictions from the DNN module 161 regarding the imminent host I/O accesses to optimize the performance of the SSD 100. There are various ways in which the knowledge of the imminent host I/O accesses can be used. For example, the SSD controller 110 can prefetch of anticipated user data, employ data cache eviction policies, prefetch of FTL data structures if necessary, optimize command execution, optimize write buffer flush based on an anticipated host flush command, prepare statistics and log data ahead of an anticipated host "Get Log" command, perform various other user I/O and administrative NVMe commands, optimize an NVMe-MI command for inventorying, configuring, and monitoring of an NVMe-based data storage device (e.g., an NVMe-based SSD), and optimize scheduling of internal operations based on an anticipated idle period. In addition, the SSD controller 110 can and execute a user-configurable reset on the SSD 100, for example, when a user starts a brand new application on leased computing and storage resources provided by a hyper-scaler such as Amazon Web Services (AWS) or Microsoft Windows Azure.

The DNN module 161 can detect a long, complex, and interleaved data access pattern of a host application. For example, based on a predicted imminent host read command to certain LBA or LBA clusters, the SSD 110 controller can prefetch the data. The prefetched data can be saved in on-chip or off-chip memory of the SSD 100. Such prefetched data can be served to the host application at a minimal latency. This technique would reduce the read latency performance significantly.

When the DNN module 161 identifies an imminent LBA or LBA cluster to execute a read or write operation thereon, the SSD controller 110 can use that knowledge to perform more optimal cache management. For example, in a cache eviction operation, the SSD controller 110 must select a block in the cache for eviction. The DNN or the LSTM computes and assign a probability of an imminent host access for each block present in the cache. When a block must be evicted from the cache, the SSD controller 110 selects the block with the lowest probability of imminent access. If multiple blocks in the cache have the same lowest probability of host access, then the SSD controller 110 selects the block that has the oldest time stamp among the blocks that has the same lowest probability for eviction. If the predicted data is present in the on-chip or off-chip cache buffers, the SSD 110 controller can lower the eviction priority for the data. On the other hand, if certain LBA ranges or LBA clusters are not predicted in the near future, the SSD 110 controller increase the eviction priority for those LBAs. The eviction priority may be dynamically change based on the prediction of imminent access to certain LBA ranges or LBA clusters.

At times to execute host commands, an FTL data structure 115 stored in the flash media 151 such as a write cache 116 and a read prefetch cache 117 may need to be fetched to the FTL 112. As the DNN module 161 predicts an LBA or LBA cluster that will be accessed in the near future, the SSD controller 110 can prefetch the FTL data structure 115 to reduce the latency to execute the associated host I/O command.

The host application may issue a variety of commands in addition to normal data read and write commands. When the DNN module 161 predicts imminent commands, the SSD controller 110 can use that knowledge opportunistically. For example, the host can issue a Flush command at times. If a Flush command is anticipated in the near future, the SSD controller 110 can potentially start a write cache flush operation early. When a host command such as "Get Smart page" or "Get Log page" is anticipated, the SSD controller 110 can keep the data ready. This approach can be used opportunistically to manage and prepare data stored in the SSD 100 associated with various administrative commands as well as management interface commands (e.g., NVMe-MI commands) of an NVMe-compatible SSD.

The SSD controller 110 can perform a number of housekeeping tasks (herein also referred to as background operations) periodically. Normally, the SSD controller 110 attempts to perform such as background operations to minimize an impact to concurrently executed host I/O commands. Since these activities are inherently asynchronous in nature, it becomes a hard and challenging problem to perform an optimal scheduling of background operations without impacting the I/O latencies. When the DNN module 161 predicts an idle gap between host data accesses, the SSD controller can use the knowledge regarding the idle gap to opportunistically prepone some of the background operations. Similarly, the SSD controller 110 can use any DNN prediction of anticipated heavy host data accesses to postpone some of the background operations.

Figure 3:
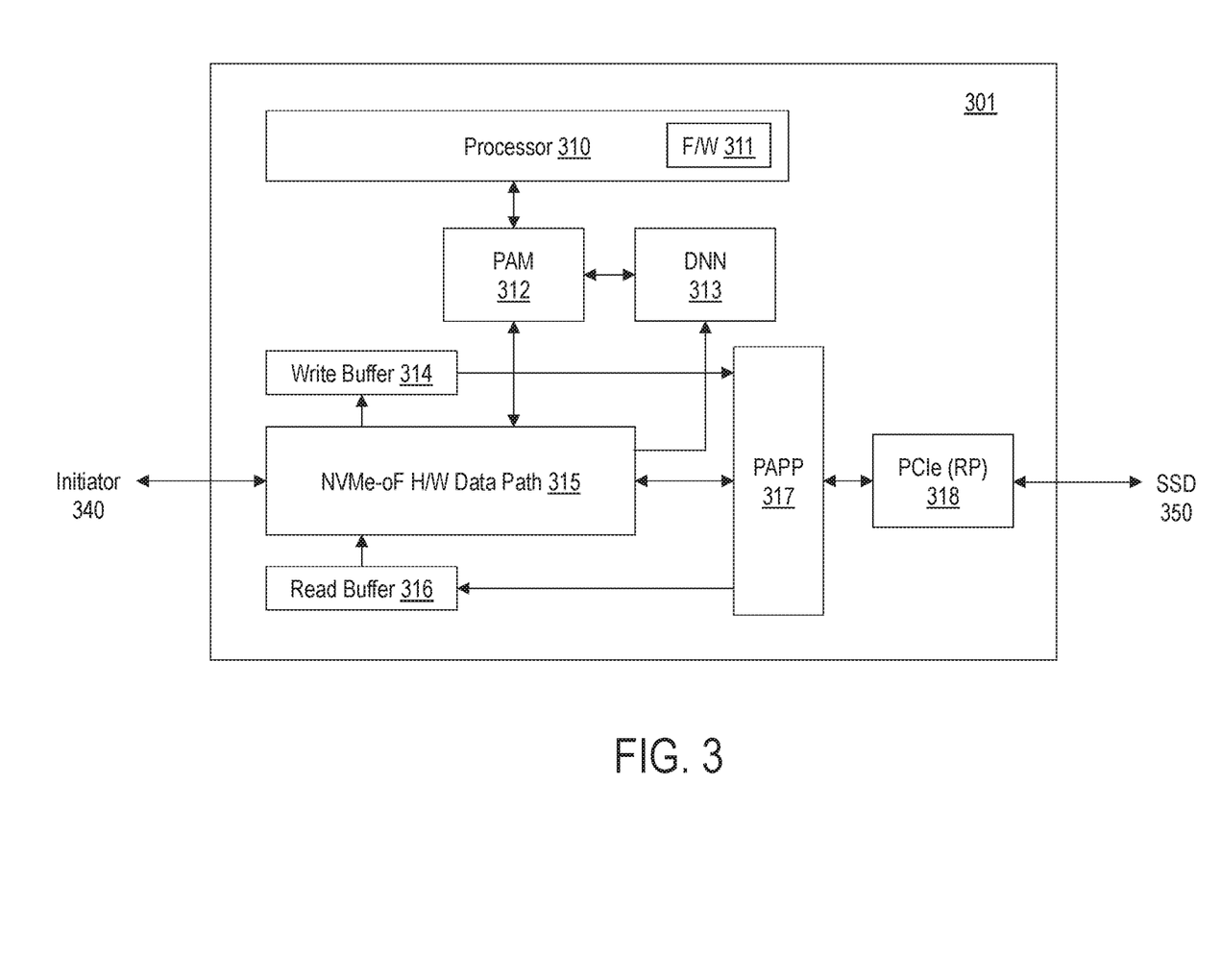
FIG. 3 shows a block diagram of an example bridge device implementing a DNN module for predicting host access patterns, according to one embodiment.

FIG. 3 shows a block diagram of an example bridge device implementing a DNN module for predicting host access patterns, according to one embodiment. A bridge device 301 includes a processor 310 executing instructions of a firmware (F/W) 311, a processor access module (PAM) 312, a DNN module 313, a write buffer 314, an NVMe-oF hardware (H/W) data path 315, a read buffer 316, a PCIe Application (PAPP) layer 317, and a PCIe root port (RP) 318. The bridge device 301 may be compatible with the NVMe-oF standard. In this case, the bridge device 301 can receive NVMe-oF commands from a remote initiator 340 (e.g., a host computer or an application running on the host computer) and provide a data storage interface to a backend SSD 350 that may be an NVMe-compatible SSD. In one embodiment, the bridge device 301 may be integrated within an Ethernet SSD (eSSD) that is compatible with the NVMe-oF standard as being implemented in an FPGA or an ASIC. The bridge device 301 may include computing and memory resources to perform the deep neural network (DNN) learning and training. Using the allocated computing and memory resources, the bridge device 301 can offload various compute and storage intensive functions from the host computer or the host application to provide accelerated data access near or within the data storage device, in the present example, the SSD 350.

The NVMe-oF hardware (H/W) data path 315 provides a host interface to the remote initiator 340 using a remote direct memory access (RDMA) protocol over an Ethernet-based transport protocol. The on-chip data buffers including the write data buffer 314 and the read data buffer 316 are used to facilitate data transfer between the remote initiator 340 and the backend SSD 350. The PAPP layer 317 and the PCIe RP 318 provide an NVMe interface to the backend SSD 350. The processor access module (PAM) 312 provides access for the NVMe-oF H/W data path 315 to the embedded processor 310 running the firmware 311. The DNN module 313 can implement the above-described LSTM/CNN logic to implement the LBA/host access prediction. The NVMe-oF H/W data path 315 feeds the input vector received from the remote initiator 340 such as LBAs and host commands to the DNN module 313. The firmware 311 running on the embedded processor can configure the DNN module 313 as well as reading the predicted LBAs and opcodes from the DNN module 313. The firmware 311 can use the prediction outputs from the DNN module 313 to assess the prediction accuracy of the DNN module 313 and other performance parameters of the DNN module 313. The DNN module 313 in conjunction with the firmware 311 may estimate accuracy of prediction errors to perform the function as the prediction error estimator 163 of FIG. 1.

According to one embodiment, a controller of a data storage device includes: a host interface providing an interface to a host computer; a flash translation layer (FTL) translating a logical block address (LBA) to a physical block address (PBA) associated with an input/output (I/O) request received from the host computer via the host interface; a flash interface providing an interface to flash media of the data storage device to access data stored on the flash media of the data storage device; and one or more deep neural network (DNN) module for predicting an I/O access pattern of the host computer. The host interface provides one or more input vectors to the one or more DNN modules, the one or more DNN modules provide one or more prediction outputs to the FTL that are associated with one or more past I/O requests and a current I/O request received from the host computer using the one or more input vectors, and wherein the one or more prediction outputs include at least one predicted I/O request following the current I/O request. The FTL prefetches data stored in the flash media that is associated with the at least one predicted I/O request.

The one or more prediction outputs may identify an idle time between host operations, and the FTL may perform background operations of the flash media during the idle time.

The one or more DNN modules may include a prediction table that stores a plurality of prediction outputs based on the current I/O request.

The controller may further include a prediction error estimator configured to provide a prediction error to the one or more DNN modules to perform training or learning the I/O access pattern associated with the one or more past I/O requests, the current I/O request, and the at least one predicted I/O request.

The FTL may determine a time and perform one or more of fetching or updating data structure of the FTL, performing an error correction, un-compressing the data, decrypt the data, performing background operations, providing statistics and logs to the host computer, and offloading a cache based on the I/O access pattern of the host computer.

The controller may be implemented in a field-programmable gate array (FPGA), an application-specific integrated circuit (ASIC), or a combination of the FPGA and the ASIC.

The one or more DNN modules may employ a long short term memory (LSTM) network or a convolutional neural network (CNN).

The data storage device may be a non-volatile memory express (NVMe) solid-state drive (SSD) or an NVMe over fabrics (NVMe-oF) SSD.

The one or more input vectors may include one or more of an LBA, a range of LBAes, a length of a host access, a number of a host access, a namespace ID, a host ID, a command opcode (OPC), an I/O type as indicated by the command opcode, a stream ID, an NVM set ID, a time delta and/or a time stamp.

The one or more prediction outputs may include one or more of an LBA, an LBA cluster, a type of a host access, an imminent idle gap, an imminent access volume.

The one or more DNN modules may assign a probability of an imminent access to each block present in a cache, and the controller may evict a block with a lowest probability from the cache.

The controller may evict a block that has an oldest time stamp from the cache if multiple blocks in the cache have a same lowest probability.

According to another embodiment, a data storage device includes: one or more flash media; a controller configured to control the one or more flash media; and one or more deep neural network (DNN) modules for predicting an I/O access pattern of a host computer. The one or more DNN modules receive one or more input vectors from the controller, provide one or more prediction outputs to the controller that are associated with one or more past I/O requests and a current I/O request received from the host computer using the one or more input vectors, and the one or more prediction outputs include at least one predicted I/O request following the current I/O request. The controller prefetches data stored in the flash media that is associated with the at least one predicted I/O request.

The one or more prediction outputs may identify an idle time between host operations, and the FTL may perform background operations of the flash media during the idle time.

The controller may include a prediction error estimator configured to provide a prediction error to the one or more DNN modules to perform training or learning the host access pattern associated the one or more past I/O requests, the current I/O request, and the at least one predicted I/O request.

The controller may be implemented in a field-programmable gate array (FPGA), an application-specific integrated circuit (ASIC), or a combination of the FPGA and the ASIC.

The data storage device may be a non-volatile memory express (NVMe) solid-state drive (SSD) or an NVMe over fabrics (NVMe-oF) SSD.

The one or more DNN modules may assign a number to each block present in a cache based on a probability of an imminent access, and the controller may evict a block with a lowest probability from the cache.

The controller may evict a block that has an oldest time stamp from the cache if multiple blocks in the cache have a same lowest probability.

According to another embodiment, a bridge device includes: one or more processors; one or more deep neural network (DNN) modules; a processor access module providing an interface between the one or more processors and the one or more DNN modules; a host interface; and a device interface to a solid-state drive (SSD). The one or more DNN modules receive one or more input vectors from the SSD via the host interface, provide one or more prediction outputs to the SSD that are associated with one or more past I/O requests from the remote initiator and a current I/O request received from the remote initiator using the one or more input vectors, and the one or more prediction outputs include at least one predicted I/O request following the current I/O request. The SSD prefetches data stored in the flash media that is associated with the at least one predicted I/O request and provides the data to the bridge device via the device interface.

The bridge device may further include a plurality of buffers storing data to transfer between a remote initiator and the SSD.

The interface to the SSD may include a PCIe Application (PAPP) layer and a PCIe root port (RP).

The host interface may be a fabric interface compatible with NVMe-oF, and the device interface may be compatible with NVMe.

The one or more DNN modules may be implemented in a field-programmable gate array (FPGA), an application-specific integrated circuit (ASIC), or a combination of the FPGA and the ASIC.

The above example embodiments have been described hereinabove to illustrate various embodiments of implementing a system and method for optimizing performance of a solid-state drive (SSD) using a deep neural network. Various modifications and departures from the disclosed example embodiments will occur to those having ordinary skill in the art. The subject matter that is intended to be within the scope of the invention is set forth in the following claims.

What is claimed is:

1. A controller of a data storage device comprising:
a host interface providing an interface to a host computer;
a flash translation layer (FTL) translating a logical block address (LBA) to a physical block address (PBA) associated with an input/output (I/O) request received from the host computer via the host interface;
a flash interface providing an interface to flash media of the data storage device to access data stored on the flash media of the data storage device; and
one or more deep neural network (DNN) modules for predicting an I/O access pattern of the host computer,
wherein the host interface provides one or more input vectors to the one or more DNN modules, wherein the one or more DNN modules provide one or more prediction outputs to the FTL that are associated with one or more past I/O requests and a current I/O request received from the host computer using the one or more input vectors, and wherein the one or more prediction outputs include at least one predicted I/O request following the current I/O request and an anticipated idle period, and
wherein the FTL determines to prefetch data stored in the flash media that is associated with the at least one predicted I/O request or perform a background operation of the flash media in the anticipated idle period prior to prefetching the data that is associated with the at least one predicted I/O request based on the one or more prediction outputs, and
wherein the one or more input vectors includes an LBA and an identifier for the I/O access pattern of the host computer.

2. The controller of claim 1, wherein the FTL postpones the background operation based on a size of the data associated with the at least one predicted I/O request.

3. The controller of claim 1, wherein the one or more DNN modules include a prediction table that stores a plurality of prediction outputs based on the current I/O request.

4. The controller of claim 1, further comprising a prediction error estimator configured to provide a prediction error to the one or more DNN modules to perform training or learning the I/O access pattern associated with the one or more past I/O requests, the current I/O request, and the at least one predicted I/O request.

5. The controller of claim 1, wherein the FTL determines a time and performs one or more of fetching or updating data structure of the FTL, performing an error correction, uncompressing the data, decrypt the data, providing statistics and logs to the host computer, and offloading a cache based on the I/O access pattern of the host computer.

6. The controller of claim 1, wherein the controller is implemented in a field-programmable gate array (FPGA), an application-specific integrated circuit (ASIC), or a combination of the FPGA and the ASIC.

7. The controller of claim 1, wherein the one or more DNN modules employ a long short term memory (LSTM) network or a convolutional neural network (CNN).

8. The controller of claim 1, wherein the data storage device is a non-volatile memory express (NVMe) solid-state drive (SSD) or an NVMe over fabrics (NVMe-oF) SSD.

9. The controller of claim 1, wherein the one or more input vectors further includes one or more of a range of LBAes, a length of a host access, a number of a host access, a namespace ID, a host ID, a command opcode (OPC), an I/O type as indicated by the command opcode, a stream ID, an NVM set ID, a time delta and/or a time stamp.

10. The controller of claim 1, wherein the one or more prediction outputs further include one or more of an LBA cluster, a type of a host access, an imminent idle gap, an imminent access volume.

11. The controller of claim 1, wherein the one or more DNN modules assign a probability of an imminent access to each block present in a cache, and the controller evicts a block with a lowest probability from the cache.

12. The controller of claim 11, wherein the controller evicts a block that has an oldest time stamp from the cache if multiple blocks in the cache have a same lowest probability.

13. A data storage device comprising:
one or more flash media;
a controller configured to control the one or more flash media; and
one or more deep neural network (DNN) modules for predicting an I/O access pattern of a host computer,
wherein the one or more DNN modules receive one or more input vectors from the controller, provide one or more prediction outputs to the controller that are associated with one or more past I/O requests and a current I/O request received from the host computer using the one or more input vectors, and the one or more prediction outputs include at least one predicted I/O request following the current I/O request and an anticipated idle period,
wherein the controller determines to prefetch data stored in the flash media that is associated with the at least one predicted I/O request or perform a background operation of the flash media in the anticipated idle period prior to prefetching the data that is associated with the at least one predicted I/O request based on the one or more prediction outputs, and wherein the one or more input vectors includes an LBA and an identifier for the I/O access pattern of the host computer.

14. The data storage device of claim 13, wherein the FTL postpones the background operation based on a size of the data associated with the at least one predicted I/O request.

15. The data storage device of claim 13, wherein the controller comprises a prediction error estimator configured to provide a prediction error to the one or more DNN modules to perform training or learning the host access pattern associated the one or more past I/O requests, the current I/O request, and the at least one predicted I/O request.

16. The data storage device of claim 13, wherein the controller is implemented in a field-programmable gate array (FPGA), an application-specific integrated circuit (ASIC), or a combination of the FPGA and the ASIC.

17. The data storage device of claim 13, wherein the data storage device is a non-volatile memory express (NVMe) solid-state drive (SSD) or an NVMe over fabrics (NVMe-oF) SSD.

18. The data storage device of claim 13, wherein the one or more DNN modules assign a number to each block present in a cache based on a probability of an imminent access, and the controller evicts a block with a lowest probability from the cache.

19. The data storage device of claim 18, wherein the controller evicts a block that has an oldest time stamp from the cache if multiple blocks in the cache have a same lowest probability.

20. A bridge device comprising:
one or more processors;
one or more deep neural network (DNN) modules;
a processor access module providing an interface between the one or more processors and the one or more DNN modules;
a host interface; and
a device interface to a solid-state drive (SSD),
wherein the one or more DNN modules receive one or more input vectors from the SSD via the host interface, provide one or more prediction outputs to the SSD that are associated with one or more past I/O requests from the remote initiator and a current I/O request received from the remote initiator using the one or more input vectors, and the one or more prediction outputs include at least one predicted I/O request following the current I/O request and an anticipated idle period,
wherein the SSD determines to prefetch data stored in a flash media of the SSD that is associated with the at least one predicted I/O request or perform a background operation of the flash media in the anticipated idle period prior to prefetching the data that is associated with the at least one predicted I/O request based on the one or more prediction outputs, and provides the data to the bridge device via the device interface, and
wherein the one or more input vectors includes an LBA and an identifier for an I/O access pattern of a host computer.

21. The bridge device of claim 20, further comprising a plurality of buffers storing data to transfer between a remote initiator and the SSD.

22. The bridge device of claim 20, wherein the interface to the SSD includes a PCIe Application (PAPP) layer and a PCIe root port (RP).

23. The bridge device of claim 20, wherein the host interface is a fabric interface compatible with NVMe-oF, and the device interface is compatible with NVMe.

24. The bridge device of claim 20, wherein the one or more DNN modules are implemented in a field-programmable gate array (FPGA), an application-specific integrated circuit (ASIC), or a combination of the FPGA and the ASIC.

* * * * *

UNITED STATES PATENT AND TRADEMARK OFFICE
CERTIFICATE OF CORRECTION

Page 1 of 1

PATENT NO. : 10,963,394 B2
APPLICATION NO. : 16/012470
DATED : March 30, 2021
INVENTOR(S) : Ramdas P. Kachare et al.

It is certified that error appears in the above-identified patent and that said Letters Patent is hereby corrected as shown below:

On the Title Page

In the list of Inventors, the inventor's name "Zvika GUZ" should be corrected to "Zvi GUZ."

Signed and Sealed this
Tenth Day of August, 2021

Drew Hirshfeld
*Performing the Functions and Duties of the
Under Secretary of Commerce for Intellectual Property and
Director of the United States Patent and Trademark Office*